(12) United States Patent
Shimada et al.

(10) Patent No.: US 9,487,149 B2
(45) Date of Patent: Nov. 8, 2016

(54) WORK VEHICLE

(71) Applicant: Kubota Corporation, Osaka-shi (JP)

(72) Inventors: Hiroshi Shimada, Sakai (JP); Koji Nada, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/764,870

(22) Filed: Feb. 12, 2013

(65) Prior Publication Data

US 2014/0225403 A1    Aug. 14, 2014

(51) Int. Cl.
*B60R 7/04* (2006.01)
*B60N 2/06* (2006.01)
*B60N 2/30* (2006.01)

(52) U.S. Cl.
CPC .............. *B60R 7/043* (2013.01); *B60N 2/06* (2013.01); *B60N 2/305* (2013.01)

(58) Field of Classification Search
CPC ........ B62D 33/06; B60N 2/305; B60N 2/06; B60R 7/043
USPC ........................................ 296/65.05, 190.01
See application file for complete search history.

(56) References Cited

U.S. PATENT DOCUMENTS

| 7,717,495 | B2 * | 5/2010 | Leonard et al. ............ 296/183.1 |
| 2006/0097507 | A1 * | 5/2006 | Toyota ................ B60K 15/063 |
| | | | 280/834 |

FOREIGN PATENT DOCUMENTS

| CA | 2429790 A1 * | 1/2004 |
| JP | 55113646 | 2/1954 |
| JP | 58160846 U | 10/1983 |
| JP | 61128139 U | 8/1986 |
| JP | 9296481 A | 11/1997 |
| JP | 2008087739 A | 4/2008 |

* cited by examiner

*Primary Examiner* — Glenn Dayoan
*Assistant Examiner* — Melissa A Black
(74) *Attorney, Agent, or Firm* — The Webb Law Firm (57) ABSTRACT

A work vehicle includes a vehicle body, an occupants' section provided in the vehicle body and having a driver's seat and a passenger's seat and a storage space that is provided under seats and opened upwards, the storage space having a first storage space section disposed under the driver's seat and a second storage space section disposed under the passenger's seat. The seats are supported to be pivotable about an axis extending along the width direction of the vehicle body and access to the first storage space section and the second storage space section is made possible by upwardly pivoting these seats. The driver's seat is slidable along the front-rear direction of the vehicle body. The first storage space section has a front-rear length shorter than the front-rear length of the second storage space section.

8 Claims, 8 Drawing Sheets

WORK VEHICLE

TECHNICAL FIELD

The present invention relates to a work vehicle including an occupants' section having a seat for a driver and a seat for a passenger.

BACKGROUND ART

As an example of such work vehicle as above, there is known a work vehicle having a storage space that is provided under seats and opened upwards (see e.g. Japanese Unexamined Patent Application Publication No. 2008-87739). In this work vehicle, the seats are supported to be pivotable about an axis extending along the width direction of the vehicle body and access to the storage space is made possible by upwardly pivoting these seats.

SUMMARY OF THE INVENTION

In the work vehicle described above, there is a need for a work vehicle wherein a storage space is disposed in a rational manner under the seats.

According one aspect of the present invention, a work vehicle comprises:

According one aspect of the present invention, a work vehicle comprises:

a vehicle body;

an occupants' section provided in the vehicle body and having a driver's seat and a passenger's seat; and a storage space that is provided under seats and opened upwards, the storage space having a first storage space section disposed under the driver's seat and a second storage space section disposed under the passenger's seat;

wherein the seats are supported to be pivotable about an axis extending along the width direction of the vehicle body and access to the first storage space section and the second storage space section is made possible by upwardly pivoting these seats;

wherein the driver's seat is slidable along the front-rear direction of the vehicle body; and wherein the first storage space section has a front-rear length shorter than the front-rear length of the second storage space section.

With the above-described arrangement, the storage space can be disposed in a rational manner under the seats.

According to one preferred embodiment of the present invention, the front end of the first storage space section is located rearwardly of the front end of the driver's seat when it is disposed at the most rearward position; and the rear end of the first storage space section is located forwardly of the rear end of the driver when it is located at the most forward position.

With the above-described arrangement, irrespectively of the vehicle body front-rear position of the driver's seat, the opening of the first storage space section is covered with the driver's seat. Therefore, while the driver's seat is configured to be slidable back and forth, the inside of the first storage space section can be protected by the driver's seat.

According to one preferred embodiment of the present invention, the passenger's seat is non-slidable along the front-rear direction of the vehicle body.

According to one preferred embodiment of the present invention, the front-rear length of the second storage space section is set longer than the front-rear length of the first storage space section.

With the above-described arrangement, the front-rear length of the second storage space section disposed under the seat which is non-slidable in the front-rear direction is set longer than the front-rear length of the first storage space section disposed under the seat which is slidable in the front-rear direction. Accordingly, the first storage space section and the second storage space section can be protected by the seats in a reliable manner and at the same time the capacity of the storage space can be enlarged.

According to one preferred embodiment of the present invention, a storage box defining the first storage space section and the second storage space section is provided between the vehicle body and the seats.

According to one preferred embodiment of the present invention, the upper end of a portion of the storage box which portion corresponds to the first storage space section has a height smaller than the height of a portion of the storage box which portion corresponds to the second storage space section; and a rail member for supporting the driver's seat with allowing it to be slidable in the front-rear direction of the vehicle body is provided at a portion of the height difference between the height of the upper end of the portion corresponding to the second storage space section and the height of the upper end of the portion corresponding to the second storage space section, such that the seating face of the driver's seat and the seating face of the passenger's seat are positioned at a substantially same height.

According to one preferred embodiment of the present invention, downwardly of the storage box, there is formed an opening that allows access to the engine; and a lid is detachably attached to the opening.

With this arrangement, access to the engine can be easily made.

According to one preferred embodiment of the present invention, to the lid, there is attached a support frame which supports the storage box.

According a further aspect of the present invention, a work vehicle comprises:

a vehicle body;

an occupants' section provided in the vehicle body and having a driver's seat and a passenger's seat; and a storage box provided between the vehicle body and the seats, the storage box defining a first storage space section which is open upwards under the driver's seat and a second storage space section which is open upwards under the passenger's seat;

wherein the seats are supported to be pivotable about an axis extending along the width direction of the vehicle body and access to the first storage space section and the second storage space section is made possible by upwardly pivoting these seats;

wherein the driver's seat is slidable along the front-rear direction of the vehicle body;

wherein the passenger's seat is non-slidable along the front-rear direction of the vehicle body;

wherein the upper end of a portion of the storage box which portion corresponds to the first storage space section has a height smaller than the height of a portion of the storage box which portion corresponds to the second storage space section; and a rail member for supporting the driver's seat with allowing it to be slidable in the front-rear direction of the vehicle body is provided at a portion of the height difference between the height of the upper end of the portion corresponding to the second storage space section and the height of the upper end of the portion corresponding to the second storage space section, such that the seating face of the driver's seat and the seating face of the passenger's seat are positioned at a substantially same height.

DESCRIPTION OF EMBODIMENTS

Next, embodiments of the present invention will be described with reference to the accompanying drawings.

Figure 1:
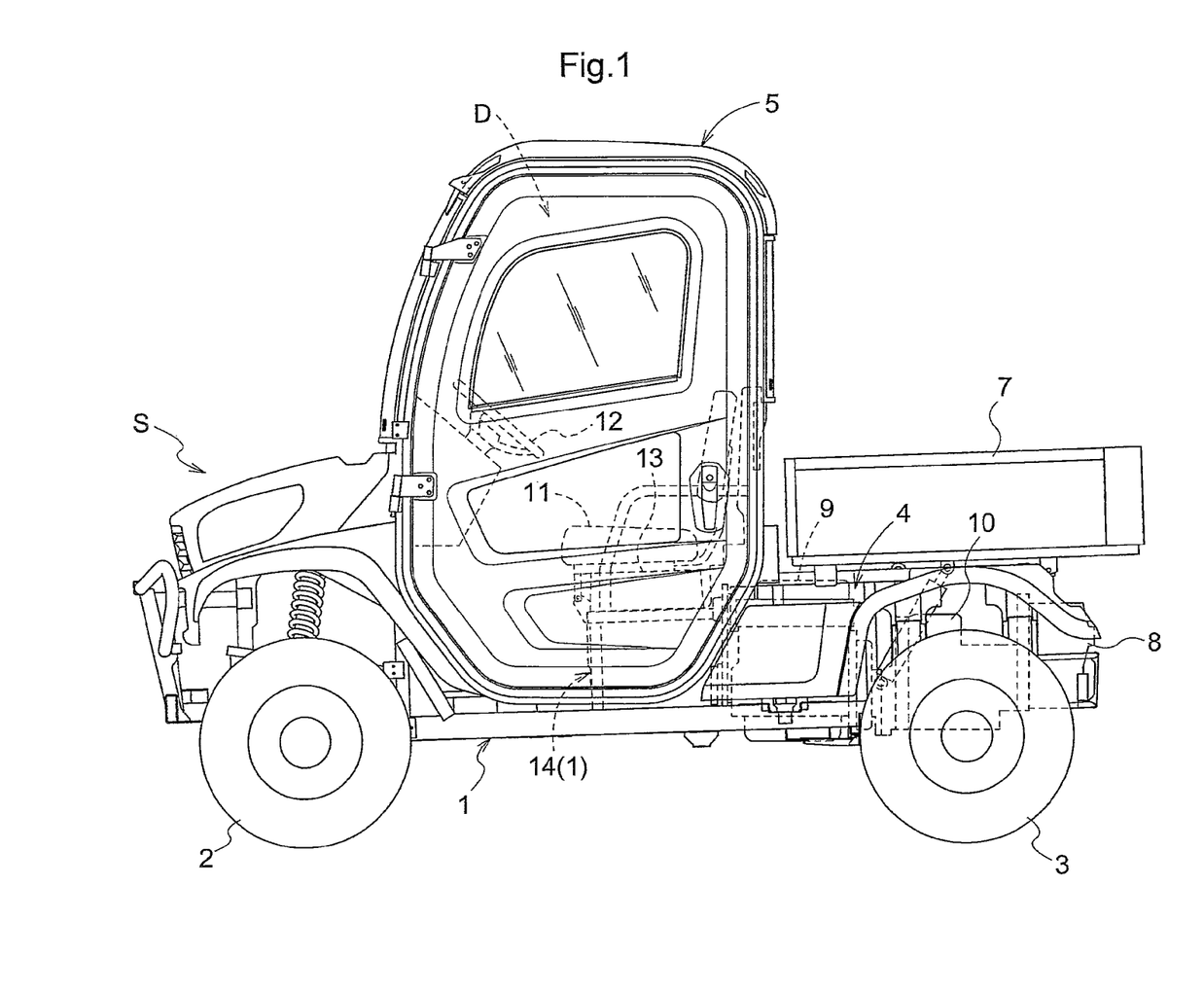
FIG. 1 is a side view of a vehicle.
Figure 2:
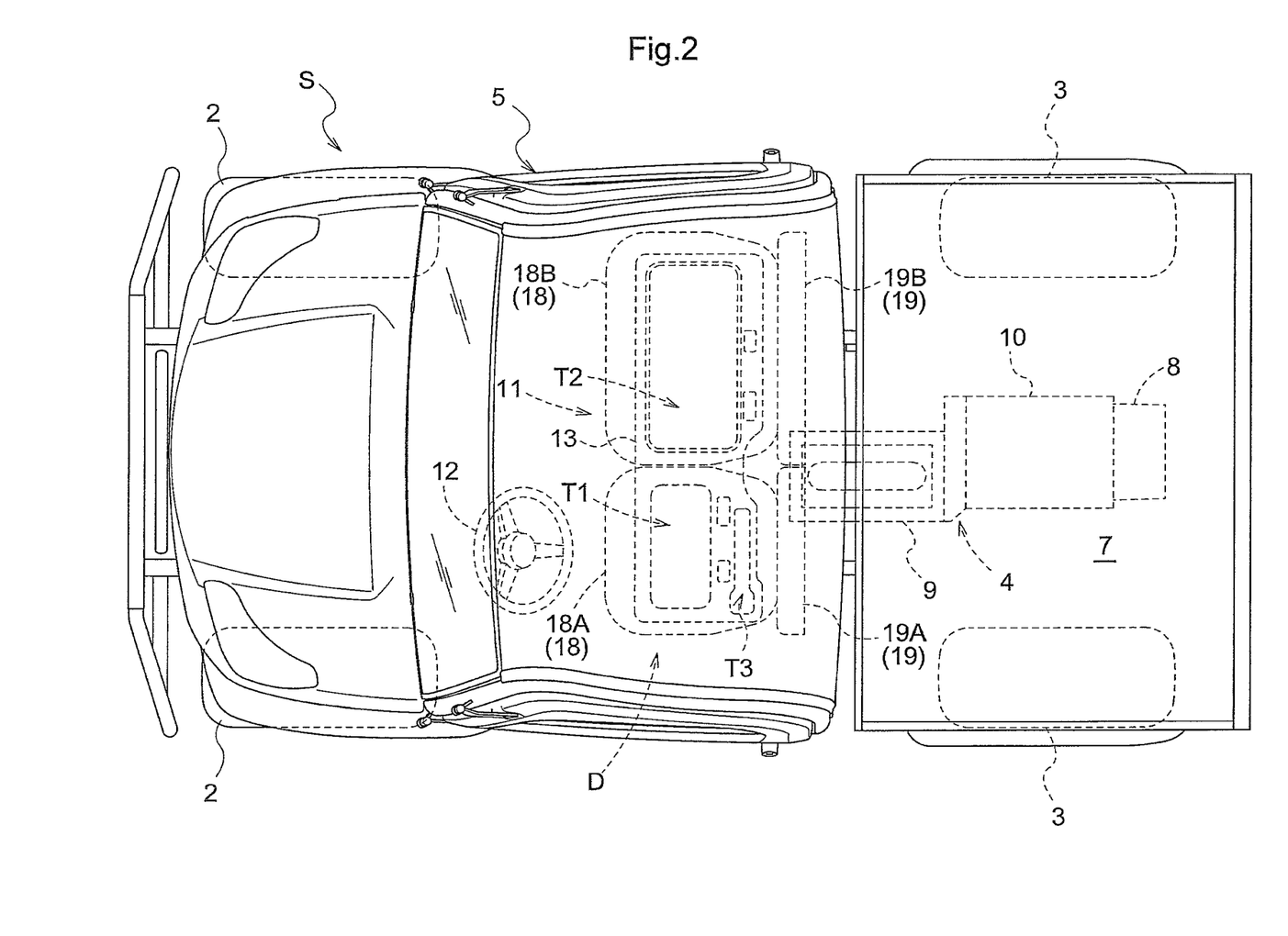
FIG. 2 is a plane view of the vehicle.

FIG. 1 and FIG. 2 show a utility vehicle as an example of a work vehicle S relating to the present invention.

The work vehicle S includes, at front and rear portions of its vehicle body 1, left and right independently suspended traveling front wheels 2 and left and right independently suspended rear wheels 3. Downwardly of a rear half portion of the vehicle body 1, an engine section 4 is mounted. At a front-rear intermediate portion of the vehicle body 1, a driver's cabin 5 is mounted. Upwardly of the rear half portion of the vehicle body 1, a dumping deck 7 is mounted. These constitute the basic construction of this work vehicle S.

The engine section 4 includes an engine 9 and a transmission case 10 connected and supported to the lower portion of the rear half portion of the vehicle body 1 and an HST (hydrostatic stepless speed changer) 8. In operation, power speed-changed through the HST 8 and the transmission case 10 is transmitted to the front wheels 2 and the rear wheels 3 for four-wheel drive traveling of the vehicle.

At the rear lower portion of the driver's cabin 5 constituting a driving section D, a seat support frame 14 as a portion of the vehicle body 1 is formed one step higher than the floor face. And, on this seat support frame 14, there is mounted a seat 11 for two to three persons including a left-side driver's seat and a right-side passenger's seat formed in series. And, on the driver's seat side (in this example, the left side) forwardly of the inside of the driver's cabin 5, there are provided such components as a steering wheel 12, un-illustrated bake pedal, accelerator pedal, etc.

Figure 3:
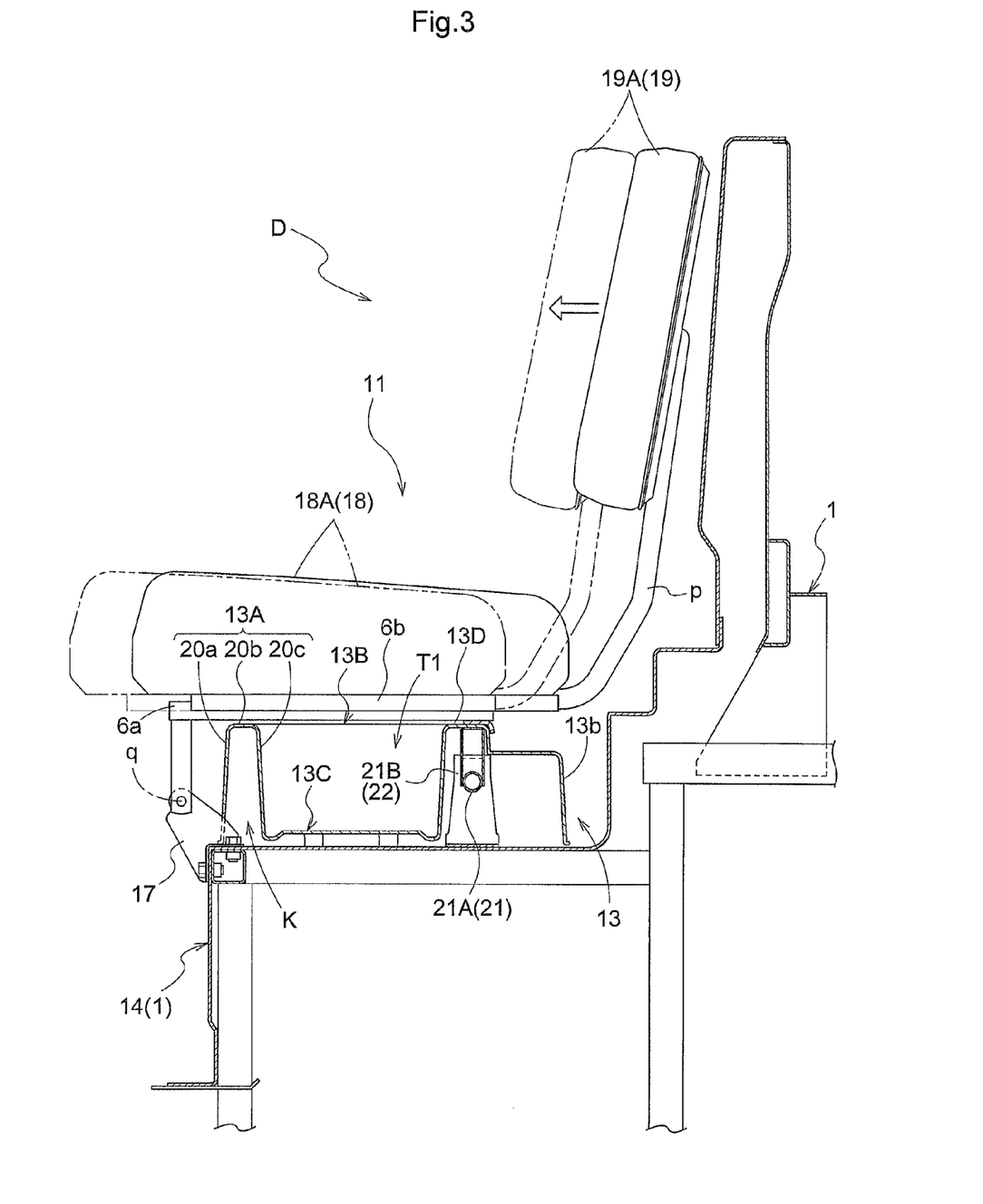
FIG. 3 is a side view showing a setting condition of a driver's seat.
Figure 4:
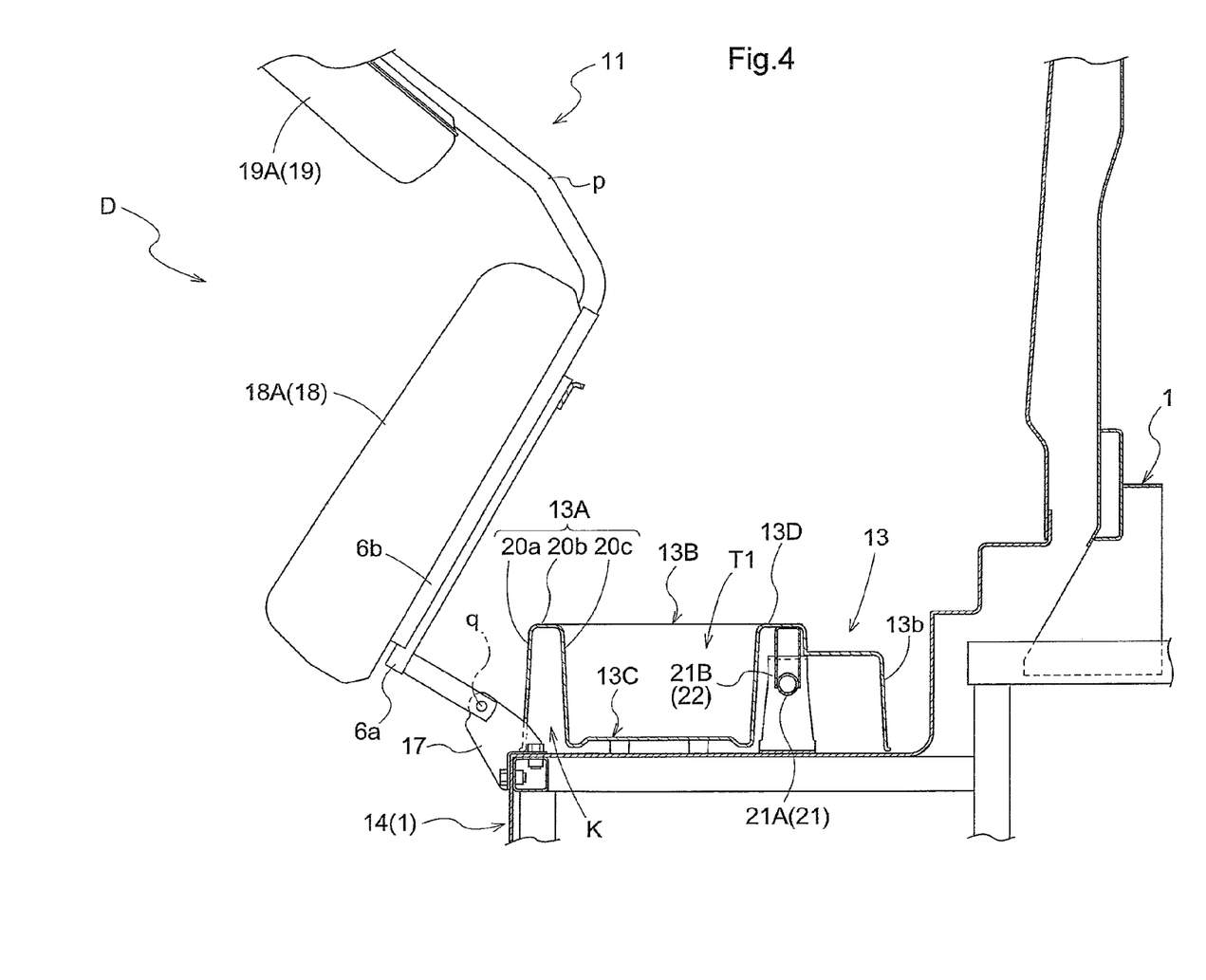
FIG. 4 is a side view showing a setting condition of the driver's seat wherein a first storage space section is opened up.

The seat 11, as shown in FIG. 3 and FIG. 4, is comprised of a seat portion 18 which is supported to hinges (corresponding to "pivot portion") mounted erect from the front portion of the seat support frame 14 to be vertically pivotable about a pivot (q), and a backrest 19 disposed along the lower portion of the rear wall inside the cabin. And, under this seat portion 18, there is disposed a storage box 13 which is elongate in the left-right direction.

Namely, the storage box 13 is detachably interposed between the vehicle body 1 and the seat 18, and the seat 18 is mounted on the storage box 13 placed on the seat support frame 14, with the seat 18 being variable in its posture as being pivoted about the pivot (q).

As shown in FIG. 3, a seat portion 18A for the driver's seat is configured to be variable in its front-rear position relative to the seat support frame 14. As an example for realizing this arrangement, there are provided a rail member 6a having its lower end pivotally connected to the hinge 17 and having an L-shape in its side view and a slide bar 6b attached to the lower face of the driver's seat portion 18A. In operation, as the slide bar 6b disposed on/along the rail member 6a is displaced to a desired position in the front-rear direction and then fixed together, the front-rear position of the driver's seat can be changed and fixed. Further, the backrest 19A of the driver's seat is attached to a pair of left and right pipes (p) protruding upwards from the rear side of the seat portion 18A, so that this backrest 19A, together with the seat portion 18A, can be vertically pivoted about the pivot (q). As shown in FIG. 4, when the seat portion 18A and the backrest 19A are pivoted upwards, a first storage space section T1 is opened up, so that access to this first storage space section T1 is made possible.

Figure 5:
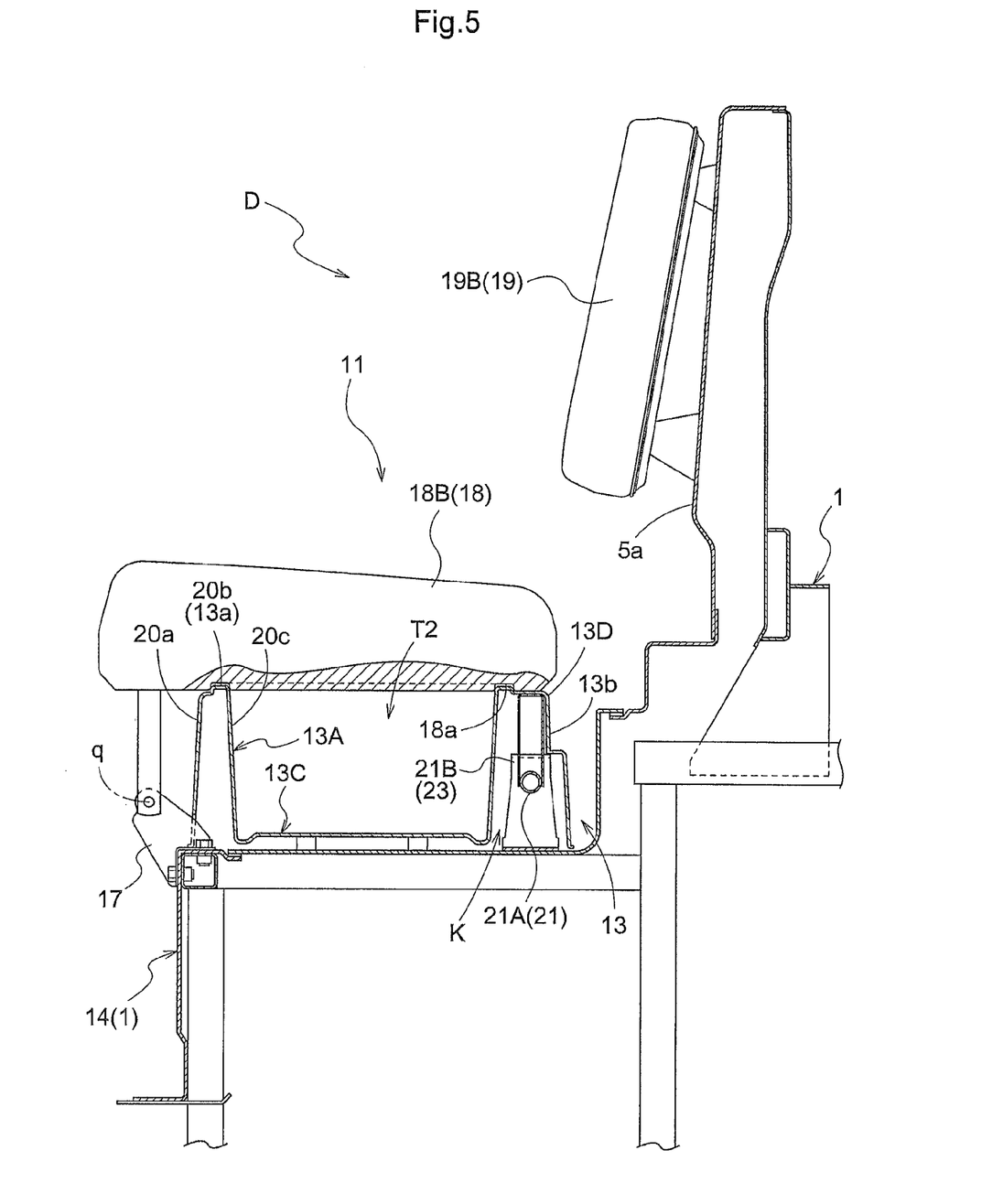
FIG. 5 is a side view showing a setting condition of a passenger's seat.

A seat portion 18B of the passenger's seat, as shown in FIG. 5, is configured to be unchangeable in its front-rear position relative to the seat support frame 14. And, a backrest 19B of the passenger's seat is formed separately from the seat portion 18B of the passenger's seat and is attached to a rear wall 5a inside the driver's cabin 5.

Accordingly, on the side of the passenger's seat, only the seat portion 18B is vertically pivotable about the pivot (q).

Further, in the lower face of the seat portion 18B of the passenger's seat, there is formed an annular recess portion 18a which is engageable with an annular projection 13a (see FIG. 7) of the storage box 13 which will be detailed later.

Figure 6:
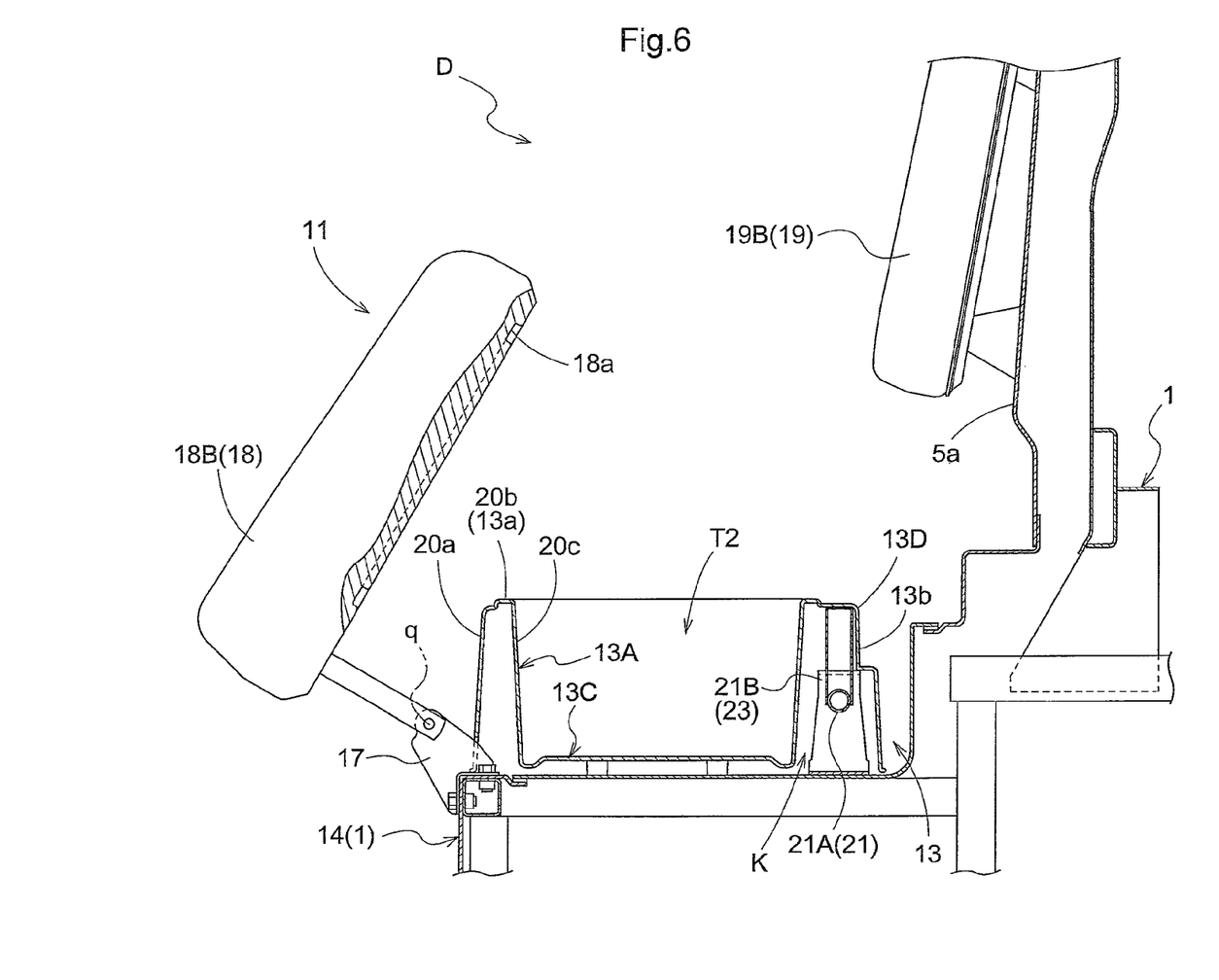
FIG. 6 is a side view showing a setting condition of the driver's seat wherein a second storage space section is opened up.

As shown in FIG. 6, when the seat portion 18B is pivoted upwards, a second storage space section T2 is opened up, so that access to this second storage space section T2 is made possible.

Figure 7:
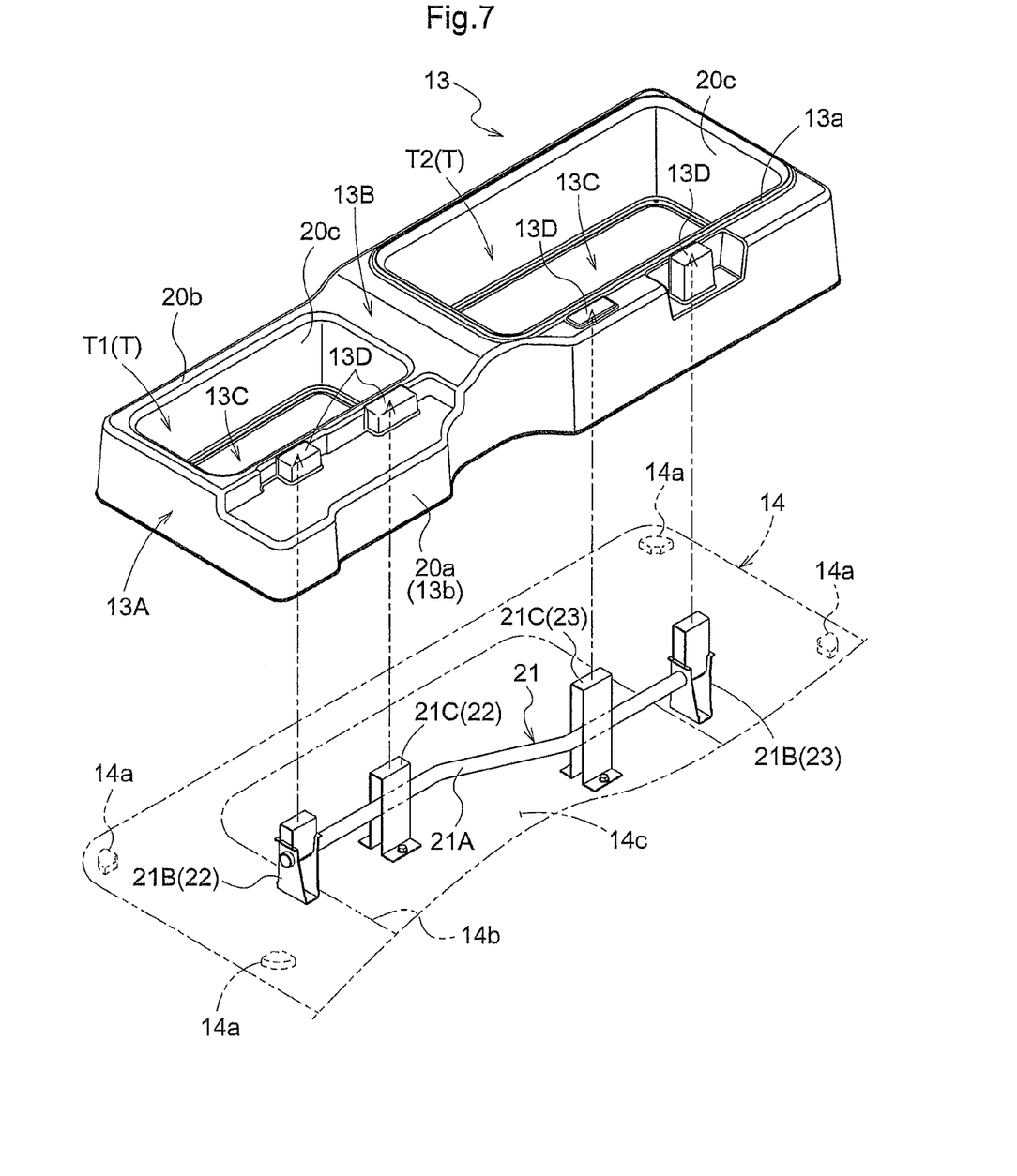
FIG. 7 is a perspective view showing examples of a storage box and a support frame.
Figure 8:
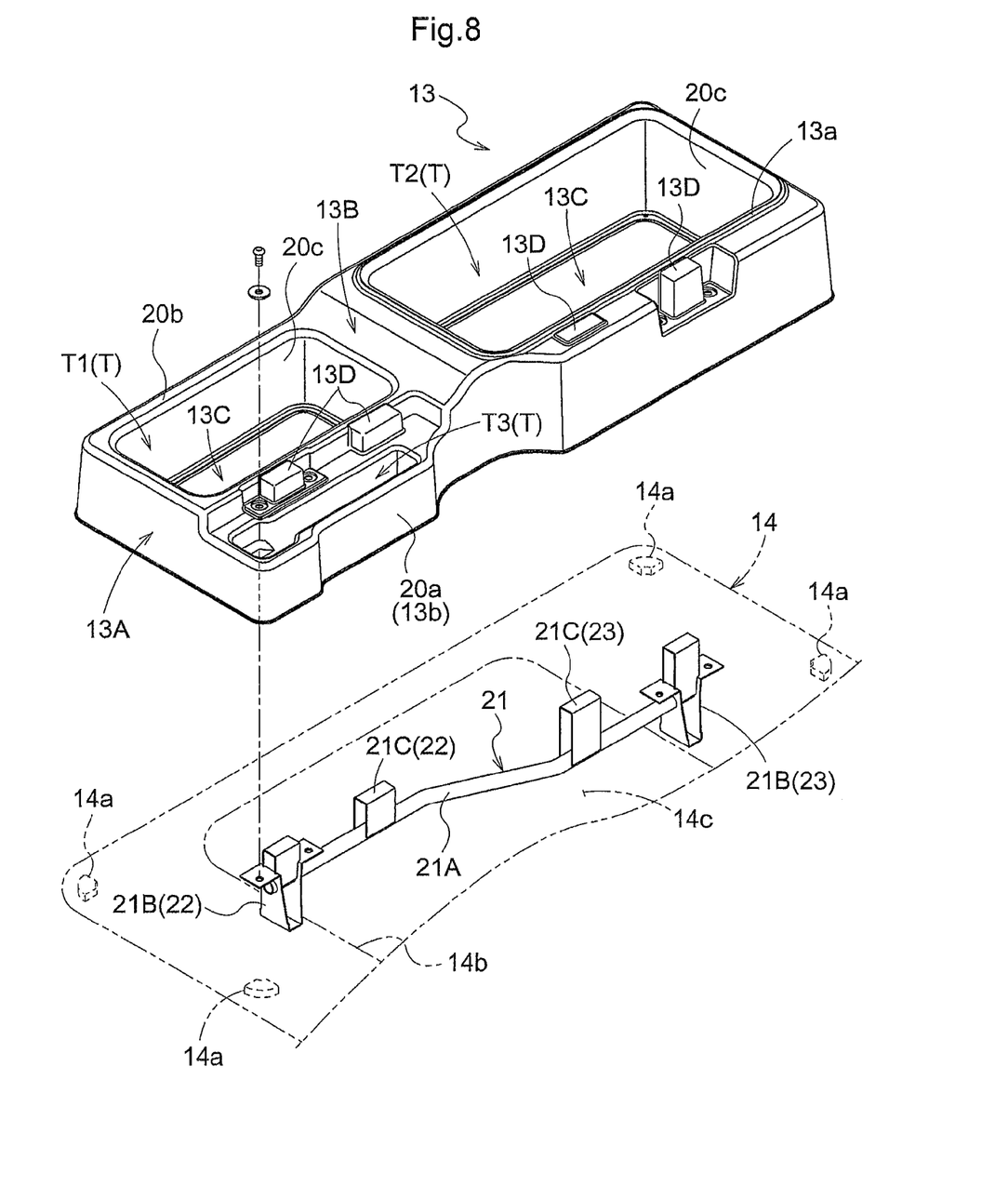
FIG. 8 is a perspective view showing further examples of the storage box and the support frame.

The storage box 13, as shown in FIG. 7, formed by injection molding of synthetic resin and has an upwardly opened shape having a peripheral wall portion 13A, an intermediate partitioning portion 13B, a bottom portion 13C and a seat supporting portion 13D.

The peripheral wall portion 13A, as shown in FIG. 5, has an upwardly projecting bulging shape and includes an outer wall portion 20a, an inner wall portion 20c disposed on the inner side thereof, and an upper wall portion 20b provided between and across the upper end portions of the outer wall portion 20a and the inner wall portion 20c.

The intermediate partitioning portion 13B too has a double-walled construction similar to that of the peripheral wall portion 13A.

The bottom portion 13C is formed integral between and across the lower edges of the inner wall portion 20c and the intermediate partitioning portion 13B.

The seat supporting portion 13D, as shown in FIG. 7, is provided at each of four positions provided in the upper wall portion 20b and spaced apart from each other. This will be explained in greater details later along with an explanation of a support frame 21.

The storage space T, as shown in FIG. 7, is formed mainly in the space delimited by the peripheral wall portion 13A and the intermediate partitioning portion 13B and is divided on the opposed sides across the intermediate partitioning portion 13B into the first storage space section T1 positioned directly under the driver's seat and the second storage space section T2 positioned directly under the passenger's seat. In one embodiment, the first storage space section T1 and the second storage space section T2 may be immovable relative to the vehicle body 1 along the front-rear direction of the vehicle body 1. The front-rear length (the length along the front-rear direction of the vehicle) of the first storage space section T1 is set shorter than the front-rear length (the length along the front-rear direction of the vehicle) of the second storage space section T2. With this shorter setting of the front-rear length of the first storage space section T1, whether the seat portion 18A of the driver's seat changeable in its front-rear position is located at the front position or rear position, the opening of the first storage space section Ti is covered completely by the seat portion 18A of the driver's seat. More particularly, the front end of the first storage space section T1 is located rearwardly of the front end of the seat portion 18A of the driver's seat 18 (see the solid line in FIG. 3) when it is located at the most rearward position and also the rear end of the first storage space section T1 is positioned forwardly of the rear end of the seat portion 18A of the driver's seat 18 (see the broken line in FIG. 3) when it is located at the most forward position.

The peripheral wall portion 13A includes an opening K at a portion downwardly between the outer wall portion 20a and the inner wall portion 20c (see FIG. 3, FIG. 5). This opening K is configured such that positioning projections 14a provided at the four corners of a storage box placing portion in the upper face of the seat support frame 14 can engage therein. Then, when the storage box 13 is to be placed on the seat support frame 14, the positioning projections 14a will be engaged with the opening K, whereby the storage box 13 will be fixed in position at a predetermined position in the upper face of the seat support frame 14 (see FIG. 5).

As shown in FIG. 7, in the storage box 13, the height of the upper face of its portion corresponding to the first storage space section T1 is set lower (smaller) than the height of the upper face of its portion corresponding to the second storage space section T2. More particularly, in the storage box 13, the upper face of its portion located under the driver's seat portion 18A is lower than the upper face of its portion located under the passenger's seat portion 18B. As described above, under the driver's seat portion 18A, there are provided such members as the rail member 6a, the slide bar 6b, etc. for allowing varying and fixing the front-rear position of the driver's seat. Then, with the above-described height setting of the upper face of the storage box 13, at the height difference portion of the upper face of the storage box 13, the rail member 6a, the slide bar 6b are disposed, whereby the driver's seat portion 18A and the passenger's seat portion 18B are disposed at a substantially same height position.

Incidentally, the seat support frame 14, as shown in FIG. 7, forms, at a portion of the area on which the storage box 13 is placed, a maintenance inspection opening 14b for the engine or the like disposed downwards. And, to this inspection opening 14b, there is attached a detachable lid 14c. When a maintenance operation is to be carried out with opening up this inspection opening 14b, the storage box 13 will be removed temporarily. After removal of the storage box 13, the lid 14c and the support frame 21 provided integrally in the lid will be removed, whereby access to the engine, etc. is made possible.

Further, in the upper wall portion 20b adjacent the second storage space section T2, there is provided the annular projection 13a along the entire circumference thereof. When the passenger's seat portion 18B is pivoted downwards, the annular recess portion 18a of the seat portion 18B comes into engagement with the annular projection 13a, whereby the second storage space section T2 can be closed. In this way, the seat 18, either the driver's seat or the passenger's seat, is capable of covering and closing the storage space T in association with a downward pivotal movement thereof.

Further, downwardly of the storage box 13, there is provided the support frame 24 for supporting the load from the seat 18 and transmitting this load to the seat support frame 14.

More particularly, the support frame 21, as shown in FIG. 7, includes, a rod portion 21A formed of a metal pipe and pillar portions 21B extending from the rod portion 21A. In the instant embodiment, the pillar portions 21B are provided at four positions, i.e. at the opposed ends of the rod portion 21A and at intermediate portions of the same. And, in this embodiment, of these pillar portions, the pillar portions provided at the intermediate positions are attached to the lid 14c with bolts. In this way, the support frame 21 is provided integral with the lid 14c. Incidentally, the support frame 21, when the storage box 13 is placed, is located on the inner side of the outer wall face 13b of the storage box 13 (between the outer wall portion 20a and the inner wall portion 20c).

The support frame 21 is dimensionally configured such that a driver's seat support portion 22 constituted of the pillar portion 21B located at the left end in the vehicle width direction and one pillar portion 21C adjacent thereto supports the driver's seat portion 18A, whereas a passenger's seat support portion 23 constituted of the pillar portion at the right end in the vehicle width direction and one pillar portion 21C adjacent thereto supports the passenger's seat portion 18B.

Further, regarding the support frame 21, taking into consideration the fact that the driver's seat portion 18A is configured to be variable in its front-rear position, the rod portion 21A is bent so that the driver's seat support portion 22 may be located forwardly of the passenger's seat support portion 23.

Accordingly, the seat 18, with its pivotal end being reliably supported by the support frame 21, can be maintained under a stable supported state.

Incidentally, at the upper ends of the driver's seat support portion 22 and the passenger's seat support portion 23, the seat supporting portions 13D of the storage box 13 are provided in such a manner as to cover them from above (see FIGS. 3, 5 and 7). The seat supporting portions 13D are provided at four positions corresponding to the respective pillar portions 21B and the respective pillar portions 21C of the support frame 21, and mainly, the seat supporting portions 13D have bulging shape, with the upper ends of the pillar portions 21B, 21C engaging therein. And, the ceiling portions of the seat supporting portions 13D correspond to the upper wall portion 20b. This upper wall portion 20b is located at the portion where load is transmitted from the seat 18 to the support frame 21, so the upper wall portion 20b can function to prevent looseness.

Further, since the support frame 21 has its entirety surrounded by the storage box 13, the frame 21 is not exposed to the outside, whereby deterioration in its durability can be prevented and also the aesthetic property thereof can be improved. In the manner described above, the support frame 21 supports the storage box 13.

With the above-described arrangement, sine load from the seat 18 can be supported by the support frame 21 in a stable manner, it is possible to reduce the strength which needs to be provided by the main body of the storage box 13. Hence, for instance, this storage box 13 can be formed thin or with emphasis on its aesthetic property, whereby there is provided greater freedom in its designing. And, it is also possible to form the storage space T large.

Furthermore, since the storage box 13 is formed by injection molding of synthetic resin, this storage box 13 can be readily formed thin, thus making it easier to ensure a large storage space.

Moreover, since the support frame 21 is disposed as being delimited by the outer wall portion 20a, the inner wall portion 20c and the upper wall portion 20b, it is possible to improve the aesthetic property thereof with prevention of exposing it to the outside and also to improve the durability of the support frame 21. Furthermore, it is also possible to provide the looseness preventing effect by the upper wall portion 20b.

[Other Embodiments]

Next, other embodiments of the present invention will be described, respectively.

(1) The storage box 13 is not limited to the one having the shape described in the foregoing embodiment. For instance, the peripheral wall portion 13A is not limited to the double-walled construction having the outer wall portion 20a, the upper wall portion 20b and the inner wall portion 20c, but can be provided as a single-walled construction.

In this case, it will be desirable in the respect of the aesthetic performance and durability that the support frame 21 be provided on the inner side of the one-walled peripheral wall portion 13A.

Further, an arrangement in which the support frame 21 is exposed to the outside of the peripheral wall portion 13A of the storage box 13 too is also possible.

(2) In the foregoing embodiment, there was explained the case wherein the support frame 21 is fixed to the lid 14c. However, as shown in FIG. 6, the support frame 21 may be fixed to the storage box 13 instead.

Incidentally, although reference marks/numerals are provided in the foregoing for the purpose of facilitating reference to the accompanying drawings, it is understood that the provision thereof is not intended to limit the scope of the present invention to the particular arrangements illustrated in the drawings. And, it is needless to say that the present invention may be modified in various ways as long as such modifications do not result in departure from the essential concept of the present invention.

The invention claimed is:

1. A work vehicle comprising:
a vehicle body;
an occupants' section provided in the vehicle body and having a driver's seat and a passenger's seat;
a storage space that is provided under the seats and opened upwards, the storage space having a first storage space section disposed under the driver's seat and a second storage space section disposed under the passenger's seat, the first storage space section and the second storage space section being immovable relative to the vehicle body along a front-rear direction of the vehicle body; and
a rail member that slidably supports the driver's seat while allowing the driver's seat to be moved relative to the first storage space section in the front-rear direction of the vehicle body, the rail member being supported by a vehicle body frame to be pivotable about an axis extending along a lateral width direction of the vehicle body;
wherein the seats are supported to be pivotable about an axis extending along the lateral width direction of the vehicle body and access to the first storage space section and the second storage space section is made possible by upwardly pivoting these seats, the driver's seat being pivotable together with the rail member;
wherein the first storage space section has a front-rear length shorter than the front-rear length of the second storage space section;
wherein the passenger's seat is non-slidable along the front-rear direction of the vehicle body; and
wherein a storage box defining the first storage space section and the second storage space section is provided between the vehicle body and the seats.

2. A work vehicle according to claim 1, wherein:
the front end of the first storage space section is located rearwardly of the front end of the driver's seat when it is disposed at the most rearward position; and
the rear end of the first storage space section is located forwardly of the rear end of the driver when it is located at the most forward position.

3. A work vehicle according to claim 1, wherein:
the front-rear length of the second storage space section is set longer than the front-rear length of the first storage space section.

4. A work vehicle according to claim 1, wherein:
the upper end of a portion of the storage box which portion corresponds to the first storage space section has a height smaller than the height of a portion of the storage box which portion corresponds to the second storage space section; and
the rail member is provided at a portion of the height difference between the height of the upper end of the portion corresponding to the second storage space section and the height of the upper end of the portion corresponding to the second storage space section, such that the seating face of the driver's seat and the seating face of the passenger's seat are positioned at a substantially same height.

5. A work vehicle according to claim 1, wherein:
downwardly of the storage box, there is formed an opening that allows access to the engine; and
a lid is detachably attached to the opening.

6. A work vehicle according to claim 5, wherein:
to the lid, there is attached a support frame which supports the storage box.

7. A work vehicle comprising:
a vehicle body;
an occupants' section provided in the vehicle body and having a driver's seat and a passenger's seat;
a storage box provided between the vehicle body and the seats, the storage box defining a first storage space section which is open upwards under the driver's seat and a second storage space section which is open upwards under the passenger's seat, the first storage space section and the second storage space section being immovable relative to the vehicle body along a front-rear direction of the vehicle body; and
a rail member that slidably supports the driver's seat while allowing the driver's seat to be moved relative to the first storage space section in the front-rear direction of the vehicle body, the rail member being supported by a vehicle body frame to be pivotable about an axis extending along a lateral width direction of the vehicle body;
wherein the seats are supported to be pivotable about an axis extending along the lateral width direction of the vehicle body and access to the first storage space section and the second storage space section is made possible by upwardly pivoting these seats, the driver's seat being pivotable together with the rail member;

wherein the passenger's seat is non-slidable along the front-rear direction of the vehicle body;

wherein the upper end of a portion of the storage box which portion corresponds to the first storage space section has a height smaller than the height of a portion of the storage box which portion corresponds to the second storage space section; and the rail member is provided at a portion of the height difference between the height of the upper end of the portion corresponding to the second storage space section and the height of the upper end of the portion corresponding to the second storage space section, such that the seating face of the driver's seat and the seating face of the passenger's seat are positioned at a substantially same height.

8. A work vehicle according to claim 7, wherein:

downwardly of the storage box, there is formed an opening that allows access to an engine and a lid is detachably attached to the opening; and wherein a support frame is provided downwardly of the storage box for supporting the load from the seats, the support frame extending across the opening.

\* \* \* \* \*